United States Patent [19]

Häring

[11] Patent Number: 4,863,363

[45] Date of Patent: Sep. 5, 1989

[54] THROTTLING DEVICE FOR A TWIN-SHAFT SREW-TYPE EXTRUDER

[75] Inventor: Erwin Häring, Stuttgart, Fed. Rep. of Germany

[73] Assignee: Werner & Pfleiderer GmbH, Stuttgart, Fed. Rep. of Germany

[21] Appl. No.: 224,581

[22] Filed: Jul. 26, 1988

[30] Foreign Application Priority Data

Aug. 26, 1987 [DE] Fed. Rep. of Germany ....... 3728442

[51] Int. Cl.$^4$ ............................................. B29C 47/40
[52] U.S. Cl. ................. 425/204; 264/211.23; 366/85; 425/208
[58] Field of Search .............. 425/200, 204, 205, 208, 425/376.1, 382.4, 146, 149; 264/211.21, 211.23, 40.3, 40.5; 366/79, 87, 83–85, 165, 186, 194–196; 422/135, 137

[56] References Cited

U.S. PATENT DOCUMENTS

| | | | |
|---|---|---|---|
| 2,814,472 | 11/1957 | Erdmenger | 366/97 |
| 2,970,341 | 2/1961 | Mallory et al. | 425/208 X |
| 3,382,536 | 5/1968 | Fritsch et al. | 425/204 X |
| 3,719,305 | 3/1973 | Loomans | 366/85 X |
| 3,780,994 | 12/1973 | Kneller et al. | 366/87 X |
| 3,814,779 | 6/1974 | Wiley | 425/208 X |
| 3,889,932 | 6/1975 | Brandis et al. | 425/205 X |
| 4,136,968 | 1/1979 | Todd | 366/85 |

FOREIGN PATENT DOCUMENTS

| | | |
|---|---|---|
| 1502335 | 10/1971 | Fed. Rep. of Germany . |
| 2924269 | 12/1980 | Fed. Rep. of Germany . |
| 2924800 | 1/1981 | Fed. Rep. of Germany . |
| 2650742 | 7/1982 | Fed. Rep. of Germany . |

Primary Examiner—Richard L. Chiesa

[57] ABSTRACT

A throttling device for a twin-shaft screw-type extruder, the housing of which is provided with bores parallel to one another and passing through one another forming saddles, has a transfer channel in each bore-defining wall, which channels are in a staggered arrangement relative to one another in the conveying direction. Retaining plates having cylindrical outer surfaces are arranged on the shaft mounted in each bore, which retaining plates can be arranged to overlap with the transfer channels so that no throttling action occurs. On the other hand, they can be brought partly to fully into axial overlapping with the wall of the respective cylindrical bores, whereby flow restricting gaps are formed between the cylindrical outer surface and each wall, the throttling effect of these gaps depending on the degree of overlapping. An operationally reliable throttling device having a linear characteristic is created by this development.

8 Claims, 3 Drawing Sheets

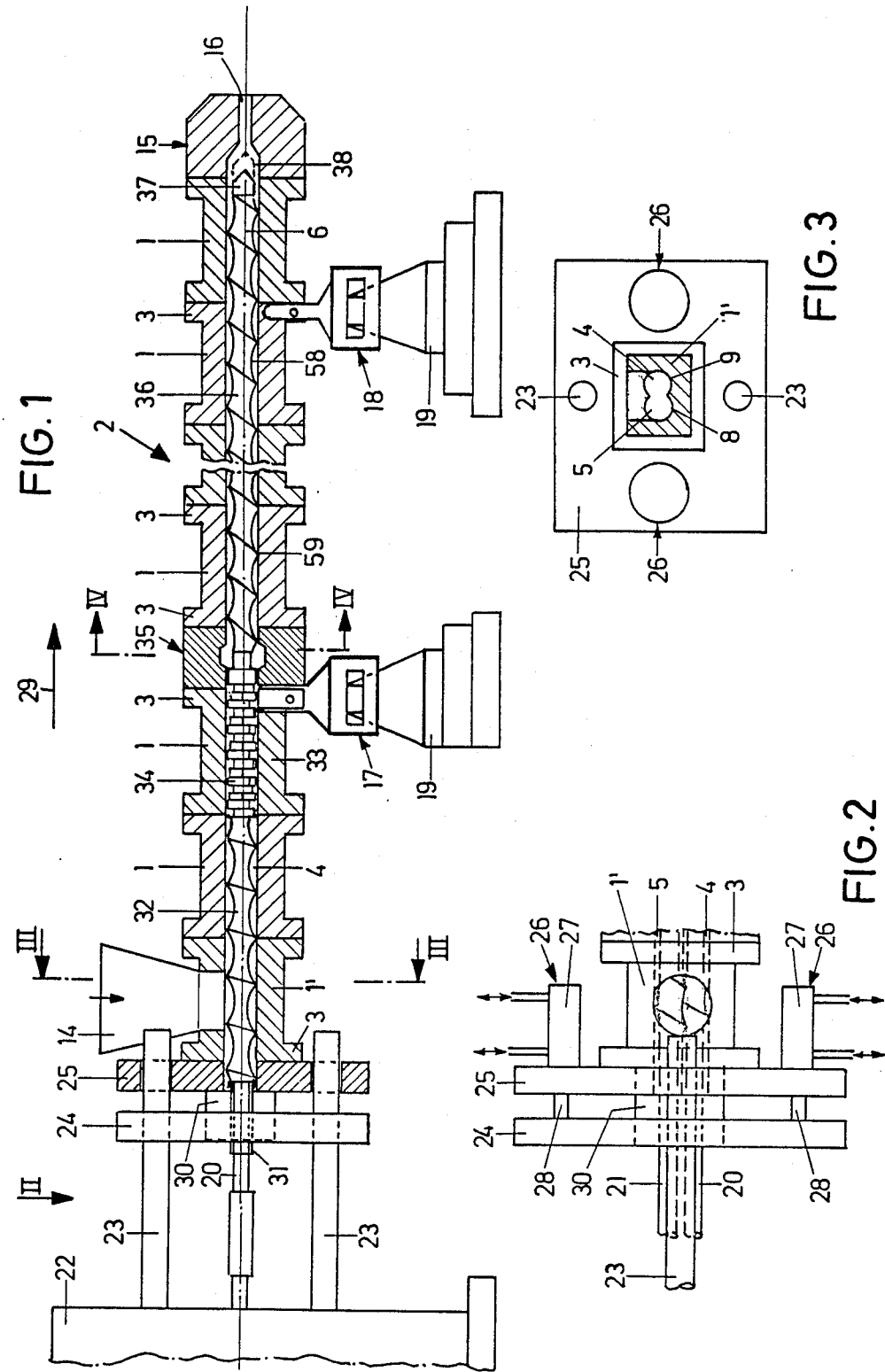

THROTTLING DEVICE FOR A TWIN-SHAFT SCREW-TYPE EXTRUDER

FIELD OF THE INVENTION

The invention relates to a throttling device for a twin-shaft screw-type extruder comprising a housing having cylindrical bores which penetrate one another while forming saddles with saddle edges and which are axially parallel to one another and in which there are arranged rotatable shafts having screw elements meshing with one another, a transfer channel which runs in the peripheral direction of the wall and extends in the conveying direction being formed in the wall of each cylindrical bore, each shaft being provided with a retining plate associated with a transfer channel, and the cylinder and the shafts being displaceable relative to one another in the conveying direction in such a manner that each retaining plate overlaps with the associated transfer channel or associated wall of the cylindrical bore.

BACKGROUND OF THE INVENTION

German published examined patent application No. 15 02 335 discloses a throttling device of the type as defined in which the transfer channels are in the form of a partial annular groove formed concentrically with the respective axes of the cylindrical bores, the two transfer channels being arranged fully overlapping one another in the axial direction. The retaining plates are in the form of kneading discs or double conical discs, it being possible for cylindrical sections to be formed in the latter in the transient area between the conical sections and an annular surface perpendicular to the axis, whereby a higher resistance to wear in the transient area between the annular surfaces and the double conical surfaces is to be achieved.

The disadvantage of this known solution is that a linear throttling characteristic is not achieved in the event of relative displacement between the housing and retaining plates. In the case of screw-type extruders generally, and particularly in the case of extruders for viscoplastic compounds which are used particularly for melting and homogenizing plastic materials, it is advantageous if the degree of melting, the melt pressure and the melt temperature can be set in specific process zones irrespective of the type of plastic material to be processed and the other operating conditions. Infinitely variable throttling devices which are subject to a great number of requirements are used in this case. With regard to process technology a correlation as linear as possible is to be achieved between the relative displacement of the retaining plates and housing and the melt pressure or pressure drop in the throttle. Furthermore, the throttle is not intended to act as an energy consumer when in the open state, i.e. the melt shall not be subjected to a pressure drop in the throttle. Finally, the throttle shall be operable from the fully open to the almost closed state. With regard to design and operating technique the throttling device shall not be susceptible to trouble during short- or long-term operation. It is intended to have in general a long service life and to be altogether very short with a simple construction. Numerous other throttling devices which are known for example from German published patent applications Nos. 29 24 269, 29 24 800 and German patent No. 26 50 742 cannot fulfil this requirement, that is particularly the requirement for a linear characteristic with, at the same time, a high operational reliability.

SUMMARY OF THE INVENTION

It is an object of the invention to create a throttling device of the type as defined which ensures a mainly linear correlation between throttle displacement and pressure drop in the throttle with high operational reliability and simple construction.

This problem is solved in that the retaining plates having a cylindrical outer surface and the transfer channels associated with the retaining plates are in a staggered arrangement relative to one another in the conveying direction, that the transfer channels do not pass through the saddles in the area of the saddle edges, and that flow restricting gaps are formed between retaining plates and associated walls of respective cylindrical bores with at least partially axial overlapping. Because of the axial staggering of the retaining plates, on the one hand, and the transfer channels, on the other hand, a flow restricting gap formed between the wall of the cylindrical bore and the cylindrical outer surface of the retaining plate is built up in each cylindrical bore in the event of corresponding displacement of the housing and retaining plate relative to one another, the throttling action of this gap depending only on its length. Over the entire path of displacement, i.e. over the entire path in which there is a throttling gap, a uniform throttling action therefore takes place over the entire circumference of the wall of each respective cylindrical bore because the width of the throttling gap is constant throughout. Because the walls of the cylindrical bores in the saddles on both sides of the saddle edges are not initially cut by the transfer channels, i.e. because the saddles pass freely through the area of the saddle edges, sealing surfaces are created relative to the outer surface of the retaining plate.

Further advantages and features of the invention are evident from the following description of an exemplary embodiment taken in conjunction with the drawing.

BRIEF DESCRIPTION OF THE DRAWING

FIG. 1 is a vertical longitudinal section through an extruder;

FIG. 2 is a partial plan view of the extruder in the direction of arrow II in FIG. 1, the upper supporting bar not being shown;

FIG. 3 is a cross-section through the extruder along the line III—III in FIG. 1, the feed hopper not being shown;

DESCRIPTION OF THE PREFERRED EMBODIMENT

Figure 4:
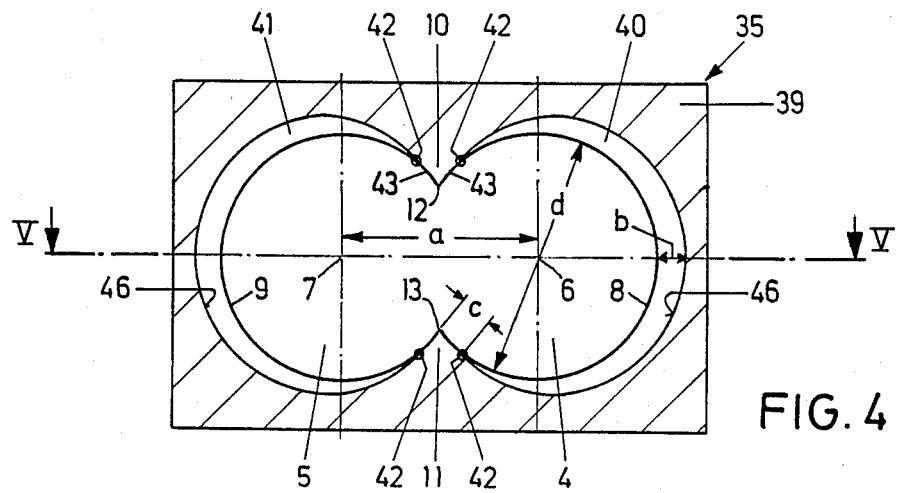
FIG. 4 is a partial cross-section through the housing of a throttling device of the extruder along the line IV-IV in FIG. 1.

The extruder shown in the drawing has a housing 2 composed of so-called housing sections 1. These housing sections 1 have an approximately rectangular cross-section and are provided at their ends with flanges 3 by means of which a series of sections 1 are combined to form a housing 2. A recess formed by two cylindrical bores 4, 5 is created in the housing sections 1 and thus also throughout the housing 2. These bores 4, 5 have central longitudinal axes 6, 7 which are parallel to one another and the distance a between which is smaller than the diameter d of the cylindrical bores 4, 5 which have equal diameters so that these bores 4, 5 pass through one another on the sides facing one another. In this area where the bores pass through one another, the only still partly cylindrical walls 8, 9 of the bores 4, 5 thus form saddles 10, 11 with saddle edges 12, 13 which likewise run parallel to the axes 6, 7. The latter are normally arranged in a common horizontal plane so that it is possible to refer to an upper saddle 10 with an upper saddle edge 12 and a lower saddle 11 with a lower saddle edge 13.

At one end—the left end in FIG. 1—the corresponding housing section 1' is provided with a feed hopper 14 for the material to be processed. At the other end—the right end in FIG. 1—a die head 15 with a moulding nozzle 16 is flange-mounted on the last housing section 1.

The housing 2 is displaceably supported on fixed brackets 19 in the direction of the axes 6, 7 by way of longitudinal sliding bearings 17, 18. For this purpose the two bearings 17, 18 are attached to corresponding flanges 3.

Two shafts 20, 21, which can be driven in the same direction by a drive unit 22, are arranged in the two bores 4, 5 parallel to the axes 6, 7. This drive unit contains in the usual manner an electric drive motor and a step-down gear and an output gear which are not shown in detail. Two supporting bars 23 are attached to the drive unit 22 vertically one above the other, i.e. perpendicular to the plane over which thw two axes 6, 7 stretch, these supporting bars bearing an abutment plate 24 which is perpendicular to the axes 6, 7 and rigidly mounted thereon in the direction of axes 6, 7. A guide plate 25, which corresponds in shape and size to the abutment plate 24 and is slidably guided on the supporting bars 23, is attached to the facing end of the housing 2. Linear displacing drives 26 in the form of piston-cylinder drives are mounted on the guide plate 25 in the plane over which the axes 6, 7 stretch and on both sides of the flange 3 of the first housing section 1', the cylinders 27 of which drives are attached to the guide plate 25 and the piston rods 28 to the abutment plate 24. Through appropriate actuation of the cylinders 27 with a pressure fluid, the entire housing 2 is thus displaced in the conveying direction 29. i.e. in the direction of the moulding head 15 or in the opposite direction. The shafts 20, 21 are locked in this case. In order to achieve a sealed closure of the bores 4, 5 in the area of the guide plate 25 or of the flange 3 bolted to this guide plate even in the event of maximum possible displacement of the housing 2 in the conveying direction 29, there is provided in the flange 3 a sealing bush 30 which passes through the guide plate 25 and is displaceable in the abutment plate 24 and in which there are provided bushes 31 for the shafts 20, 21.

Screw elements 32 are arranged on the shafts 20, 21 in the first two housing sections 1 in the conveying direction 29, i.e. in this area the material introduced through the feed hopper 14 is first drawn in and conveyed and the necessary pressure is built up. In the third housing section 1 in the drawing this section is followed by a melting zone 33 in which meshing kneading plates 34— which are generally known on extruders—are arranged on the shafts 20, 21. Kneading plates are known from U.S. Pat. No. 2,814,472. The melting zone is followed by a throttle 35 which is to be described in even more detail further on and which is arranged between the flanges 3 of two adjacent housing sections 1. Following this throttle, screw elements 36 are again mounted on the shafts 20, 21. The screw elements 32 and 36 intermesh because the distance a between the axes 6,7 is smaller than the diameter d of the bores 4, 5. At the end which is the front end in the conveying direction 29, the screw elements 36 are followed by screw tips 37 which project into distributing channels 38 arranged in front of the tips in the nozzle 16. The distributing channels 38 are designed with such a length that they can take up the relative displacement of the housing 2 to the shafts 20, 21 and thus also of the moulding head 15 relative to the screw tips 37.

Figure 5:
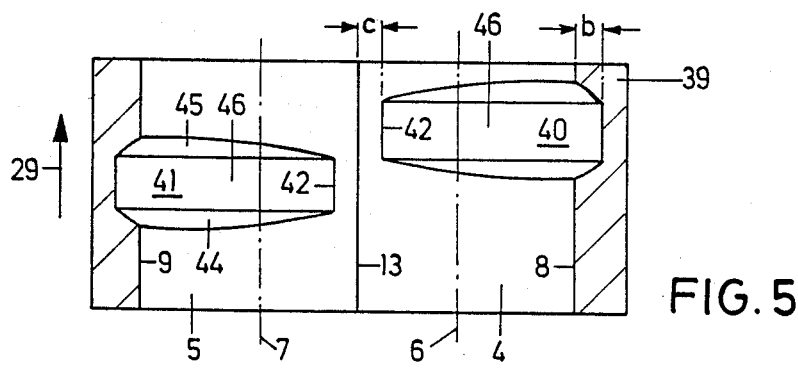
FIG. 5 is a cross-section through the housing of the throttling device along the line V—V in FIG. 4.

The throttle 35 has a throttle housing 39 through which the bores 4, 5 pass with the axes 6, 7. In FIG. 4 the saddles 10, 11 with their saddle edges 12, 13 can be seen particularly well in the area where the two bores 4, 5 pass through one another. As can be seen from FIGS. 4 and 5, there are formed in the throttle housing transfer channels 40, 41 each one of which is associated with each respective bore 4 and 5. Each transfer channel 40 or 41 is incorporated in the manner of a partial annular groove in the corresponding wall 8 or 9 of the bore 4 or 5. Each transfer channel 40 or 41 ends in front of the two saddle edges 12, 13, i.e. each channel has over an approximate range of 180° a constant depth b perpendicular to the axis 6 or 7 and then runs continuously into the wall 8 or 9 of the bore 4 or 5 in the two areas facing the saddles 10 and 11, respectively. The distance c of this transient edge 42 between the transfer channel 40 or 41 and associated saddle edge 12 or 13 is several millimetres, for example 3 to 5 mm, so that a sealing surface 43 is formed by that area of the wall 8 or 9 of the bore 4 or 5 which is left between each transient edge 42 and the associated saddle edge 12 or 13. In the axial direction, i.e. when seen in the conveying direction, there are formed inclined flow-on surfaces 44 and flow-off surfaces 45 which connect the respective walls 8 and 9 of the bores 4 and 5 to the outer surface 46 of respective transfer channels 40 and 41. These flow-on surfaces or flow-off surfaces are therefore interfaces between the wall 8 or 9 and the outer surface 46.

Cylindrical retaining plates 47, 48 are mounted on the shafts 20, 21 in the throttle 35. A flow restricting gap 50 or 51 is formed between the cylindrical outer surfaces 49 of the retaining plates 47, 48 and the corresponding wall 8 or 9 of the bore 4 or 5, which gap has a radial gap width s to which $0.005 \, d \leq s \leq 0.025 \, d$ applies. Therefore, $d' = d - 2s$ applies to the diameter $d'$ of the retaining plates 47 or 48. The two retaining plates 47, 48 are staggered relative to one another in the conveying direction 29 in the same manner as the transfer channels 40, 41. On their faces 52, 53 directed towards one another, they move past one another approximately free from play. The design of their faces 54, 55 which are remote from one another should correspond to that of the faces 52, 53.

Each retaining plate 47, 48 is associated with a cooperating plate 56 or 57 on the corresponding other shaft 21 or 20, the diameter $d''$ of this cooperating plate being smaller than the diameter $d'$ of the retaining plates 47 or 48 by the dimension $2 \, (d' - a)$. The cooperating plates 56, 57 are designed in one piece with the retaining plates 47 and 48, respectively, on the same shaft, as is evident from FIGS. 6a to 6f. As is also shown in these figures of the drawing the retaining plates 47, 48 have in the area of their cylindrical outer surfaces 49 an axial extension, i.e. a length e to which $0.25d \leq e \leq 0.6\ d$ applies, which corresponds to the axial extension, i.e. the length f, of the outer surfaces 46 of the transfer channels 40, 41. The two transfer channels 40, 41, i.e. their outer surfaces 46, are therefore also staggered relative to one another by the length f. The same applies to the staggered arrangement of the retaining plates 47, 48 in the conveying direction 29.

The above described design of the sealing surfaces 43 between the transient edges 42 of the transfer channels 40, 41 and the associated saddle edges 12, 13 ensures, together with the cylindrical outer surfaces 49 of the retaining plates 47, 48, that no leakage places are formed here through which material to be treated can pass from one bore 4 into the other bore 5 and vice versa.

Figure 7:
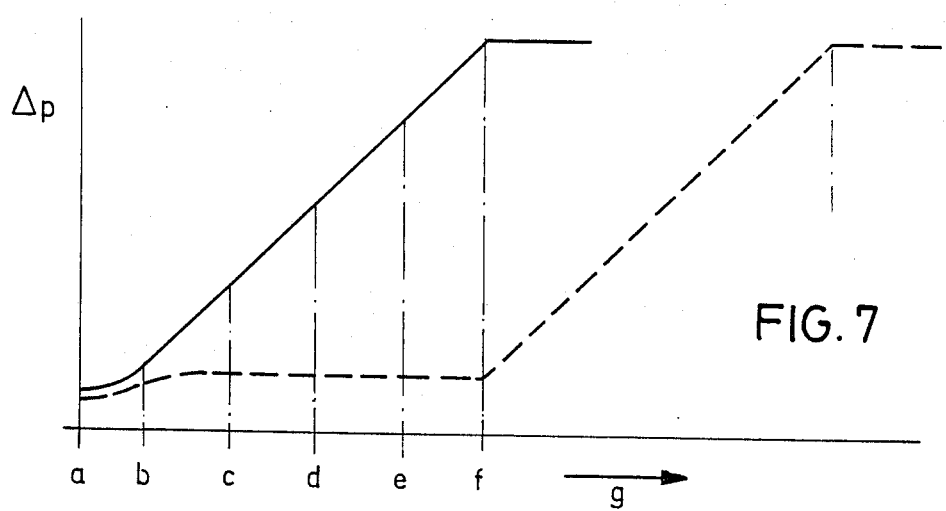
FIG. 7 is a diagram showing the pressure drop in the throttling device over the path of throttle displacement.

The mode of operation is evident from FIGS. 6a to 6f together with FIG. 7. The total path of displacement g of the housing 2 relative to the shafts 20, 21 and thus to the retaining plates 47, 48 is greater than the length e of the outer surface 49 of the retaining plates 47, 48 and the length f of the outer surface 46 of the transfer channels 40, 41 by the axial extension h of the flow-on surfaces 44 and flow-off surfaces 45, respectively. The maximum possible length 1 of the flow restricting gap 50 is therefore equal to the length e of the outer surfaces 49 of the retaining plates 47, 48.

If the retaining plates 47, 48 are situated exactly above the transfer channels 40, 41, the plastic melt which is melted particularly in the forward melting zone 33 can flow into the transfer channels 40 or 41 via the flow-on surfaces 44 approximately without pressure loss and flow out again via the flow-off surfaces 45. The pressure loss with the throttle in different positions is shown in FIG. 7, the positions which correspond to FIGS. 6a, 6b, 6c, 6d, 6e, 6f being designated by the letters a, b, c, d, e, f to correspond to the letters in the figure designation on the abscissa which reproduces the displacement path g of the housing 2 relative to the retaining plates 47, 48. Upon displacement of the housing 2 from the fully open position of the throttle 35 into the position shown in FIG. 6b, i.e. upon displacement by the length h of the flow-on surface 44, only a slight increase in pressure drop takes place because in this area the open inlet cross-section leading into the transfer channel 40 or 41 is still relatively large.

Figure 6A:
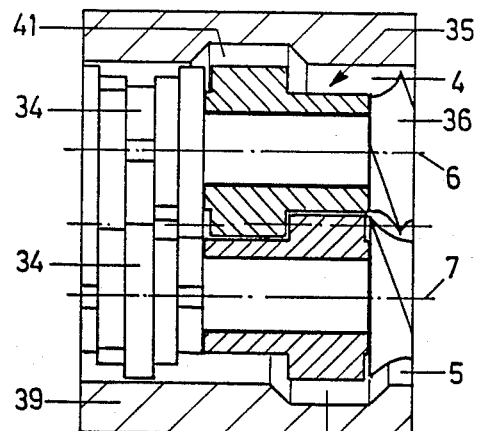
FIG. 6a to 6f are horizontal longitudinal sections through the throttling device in different throttling positions.
Figure 6B:
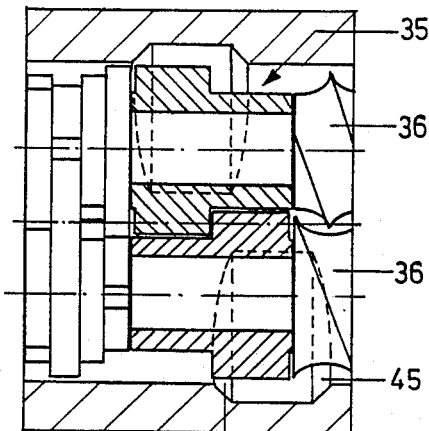
Figure 6C:
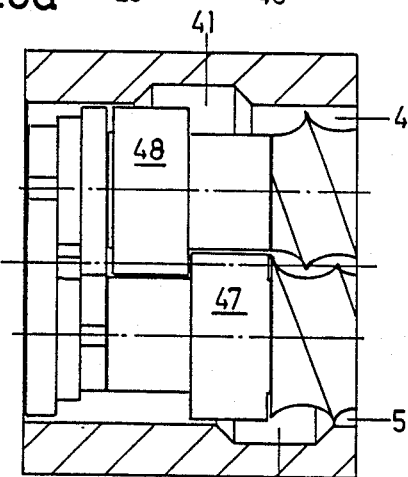
Figure 6D:
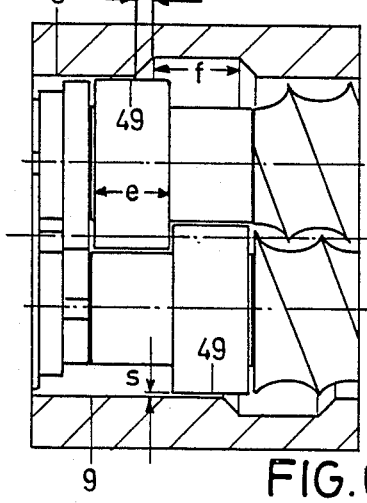
Figure 6E:
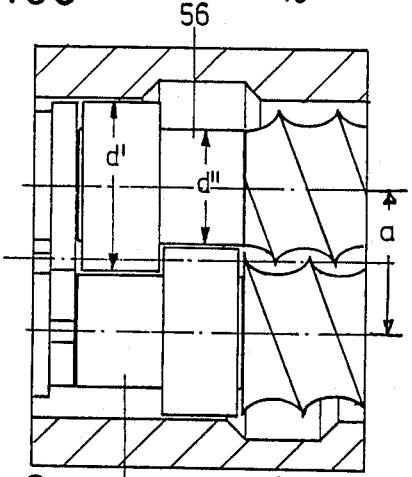
Figure 6F:
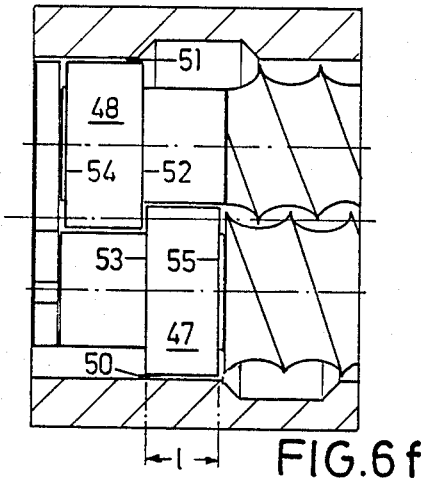

Upon a gradual further axial displacement of the housing 2 relative to the retaining plates 47 or 48, there is a linear increase in the pressure drop of the melt in the flow restricting gap 50, 51 as the length of the gap 50 or 51 increases, as is evident from FIG. 7 in the range from b to f. The pressure drop is proportional to the length of the flow restricting gap 50, 51. The maximum pressure drop is achieved if the maximum length 1 of the flow restricting gap 50, 51 is achieved, which is shown in FIG. 6f. Further axial displacements of the retaining plates 47, 48 relative to the housing 2 would—as indicated in FIG. 7—cease to produce an increase in the throttling action, i.e. pressure drop, in the flow restricting gap 50, 51.

If the sealing surfaces 43 were not provided, i.e. if the transfer channels 40, 41 were in the form of partial annular grooves concentric with the axes 6, 7 over the entire circumference of each wall 8 or 9, the pressure drop would follow the curve path shown by the broken line in FIG. 7 in contrast to the previously described curve indicated by the unbroken line in FIG. 7. There would therefore be a long initial area in which, despite displacement of the throttle, no appreciable pressure drop would take place; only at a relatively late stage would a linear pressure rise then occur. The pressure drop shown on the ordinate of the diagram according to FIG. 7 is designated therein by $\Delta p$.

The width s of the flow restricting gaps 50, 51 and the maximum length 1 of the flow restricting gaps and the resulting dimensioning of the retaining plates 47, 48 and transfer channels 40, 41 are dependent on the viscosity of the melt, the variations in viscosity between the polymers to be used, the maximum desired melt pressure and desired steepness of the characteristic curve shown in FIG. 7, as well as the operational data, such as flow rate and melt temperature. In principle the length 1 of the flow restricting gap 50, 51 is kept as small as possible in order to minimize in turn the length f of the transfer channels 40, 41, because stagnation zones, i.e. zones in which material can settle, are to be avoided as much as possible.

The cross-sectional area of the transfer channels 40, 41 between their outer surface 46 and the outer surface 49 of the retaining plates 47 or 48 is approximately 0.5 to 1.5 times the free cross-section between the core 58 of the screw elements 32 or 36 and the associated walls 8 and 9 of the cylindrical bores 4 and 5, respectively. The screw elements 32 or 36 which are associated with each other intermesh, i.e the lands 59 of a screw element 32 or 36 bear approximately against the core 58 of the adjacent screw element 32 or 36, i.e. only the play necessary to the design is still present. A stripping effect is achieved by this means.

What is claimed is:

1. Throttling device for a twin-shaft screw-type extruder comprising:
   a housing (2) having cylindrical bores (4, 5) with walls (8, 9) which penetrate one another while forming saddles (10, 11) with saddle edges (12, 13) and which are axially parallel to one another;
   rotatable shafts (20, 21) being arranged in the cylindrical bores (4, 5) and having screw elements (32, 36) meshing with one another;
   a transfer channel (40, 41) being formed in the wall (8, 9) of each cylindrical bore (4, 5) and running in a peripheral direction of the wall (8, 9) and extending in a conveying direction (29);
   a retaining plate (47, 48) being provided on each shaft (20, 21) and being associated with one of said transfer channels (40, 41);
   the housing (2) and the shafts (20, 21) being displaceable relative to one another in the conveying direction (29) in such a manner that each retaining plate (47, 48) overlaps with the associated transfer channel (40, 41) or with the wall (8, 9) of the cylindrical bore (4, 5) in which the retaining plate (47, 48) is provided; and
   wherein the retaining plates (47, 48) having a cylindrical outer surface (49) and the transfer channels (40, 41) associated with the retaining plates (47, 48) are in a staggered arrangement relative to one another in the conveying direction (29), wherein the transfer channels (40, 41) do not pass through the saddles (10, 11) in the area of the saddle edges (12, 13), and wherein flow restricting gaps (50, 51) are formed between retaining plates (47, 48) and associated walls (8, 9) of respective cylindrical bores (4, 5) with at least partially axial overlapping.

2. Throttling device according to claim 1, wherein a sealing surface (43) defined by an area of the walls (8, 9) of respective cylindrical bores (4, 5) is formed between the saddle edges (12, 13) on each transfer channel (40, 41).

3. Throttling device according to claim 1, wherein the retaining plates (47, 48) are arranged relative to one another approximately free from play on their faces (52, 53) directed towards one another.

4. Throttling device according to claim 3, wherein the two transfer channels (40, 41) are arranged staggered relative to one another in the conveying direction (29) approximately by the length (e) of the retaining plates (47, 48).

5. Throttling device according to claim 1, wherein the length (f) of the transfer channels (40, 41) and the length (e) of the retaining plates (47, 48) in the conveying direction (29) are approximately equal.

6. Throttling device according to claim 1, wherein the transfer channels (40, 41) have inclined flow-on surfaces (44) and flow-off surfaces (45) between their outer surfaces (46) and the walls (8, 9) of respective cylindrical bores (4, 5).

7. Throttling device according to claim 1, wherein $0.005d \leq s \leq 0.025d$ applies to the gap width (s) of flow restricting gaps (50, 51) in proportion to the diameter (d) of the cylindrical bores (4, 5).

8. Throttling device according to claim 1, wherein $0.25d \leq e \leq 0.6d$ applies to the length (e) of the retaining plates (47, 48) in proportion to the diameter (d) of the cylindrical bores (4, 5).

* * * * *